United States Patent [19]

Thomas

[11] Patent Number: 5,419,074
[45] Date of Patent: May 30, 1995

[54] FISH LANDING DEVICE

[76] Inventor: John C. Thomas, 2984 Canna St., Thousand Oaks, Calif. 91360

[21] Appl. No.: 106,872

[22] Filed: Aug. 16, 1993

[51] Int. Cl.⁶ .............................................. A01K 77/00
[52] U.S. Cl. .................................................. 43/5; 43/11
[58] Field of Search ............... 43/5, 105, 106, 100, 43/8, 11; 119/203, 725, 201; 294/74, 75

[56] References Cited

U.S. PATENT DOCUMENTS

| | | | |
|---|---|---|---|
| 1,797,251 | 3/1931 | Tyrrell | 43/5 |
| 2,782,546 | 2/1957 | Edworthy | 43/11 |
| 2,921,397 | 1/1960 | Luthi | 43/11 |
| 4,292,753 | 10/1981 | Yesuratnam | 43/5 |

FOREIGN PATENT DOCUMENTS

| | | | |
|---|---|---|---|
| 782511 | 6/1935 | France | 43/5 |
| 60401 | 1/1939 | Norway | 43/5 |

Primary Examiner—P. Austin Bradley
Assistant Examiner—Jeanne M. Elpel
Attorney, Agent, or Firm—Robert M. Sperry

[57] ABSTRACT

A fish landing device comprising a generally conical landing device having a rigid frame with a flexible covering supported by the frame with an opening at each end of the covering to facilitate drawing the fish into the covering while the line is still attached and having a slot extending the entire length of the frame to allow drawing the line completely through the landing device, together with straps for securing the covering about the fish to immobilize the fish for safe removal of the hook.

34 Claims, 4 Drawing Sheets

FISH LANDING DEVICE

BACKGROUND

1. Field of Invention

This invention relates to fishing equipment and is particularly directed to improved means for assisting in landing and removing a hook from a fish.

2. Prior Art

In the sport of fishing, one of the most dangerous periods, for both fish and fisherman, is that of bringing the fish into the boat and removing the hook. Often, the fish will make a desperate effort to escape as it is being lifted from the water and, again, when it is being handled to remove the hook. In both instances, the fish may injure itself by banging against the boat, by becoming tangled in the line or by tearing the hook out of their mouths, causing possibly fatal injury to themselves. Also, the fish may bite the fisherman or cut him with its fins, which is extremely painful and likely to become infected. Numerous types of devices have been proposed heretofore for overcoming these difficulties. Thus, gaffs are often used to boat larger fish, but these do nothing to immobilize the fish to facilitate removal of the hook. Also, nets have been used to boat smaller fish. However, these nets do not immobilize the fish and often become tangled about the fish, making it difficult to extract the fish from the net and adding to the likelihood of injury to the fish and fisherman. Other fish landing devices have been proposed which were complex and expensive to purchase and difficult to use. Thus, none of the prior art fish landing devices have been entirely satisfactory.

BRIEF SUMMARY AND OBJECTS OF INVENTION

These disadvantages of the prior art are overcome with the present invention and an improved fish landing device is proposed which is simple and inexpensive to purchase and use, which will not foul the line as the fish is brought in, which completely immobilizes the fish to facilitate landing and hook removal and which completely protects the fisherman against being bitten or cut by the fish's fins.

The advantages of the present invention are preferably attained by providing an improved fish landing device comprising a generally conical landing device having a rigid frame with a flexible covering supported by the frame with an opening at each end of the covering to facilitate drawing the fish into the covering while the line is still attached and having a slot extending the entire length of the frame to allow drawing the line completely through the landing device, together with straps for securing the covering about the fish to immobilize the fish for safe removal of the hook.

Accordingly, it is an object of the present invention to provide improved means for landing a fish.

Another object of the present invention is to provide improved means for immobilizing a fish to facilitate safe removal of a hook.

An additional object of the present invention is to provide improved means for landing and immobilizing a fish while protecting the fish and fisherman against possible injury.

A further object of the present invention is to provide an improved fish landing and immobilizing device which is simple and inexpensive to purchase and use.

Another object of the present invention is to provide improved means for landing and immobilizing a fish which will not foul the line as the fish is brought in.

A specific object of the present invention is to provide an improved fish landing device comprising a generally conical landing device having a rigid frame with a flexible covering supported by the frame with an opening at each end of the covering to facilitate drawing the fish into the covering while the line is still attached and having a slot extending the entire length of the frame to allow drawing the line completely through the landing device, together with straps for securing the covering about the fish to immobilize the fish for safe removal of the hook.

These and other objects and features of the present invention will be apparent from the following detailed description, taken with reference to the figures of the accompanying drawing.

DETAILED DESCRIPTION OF THE INVENTION

Figure 1:
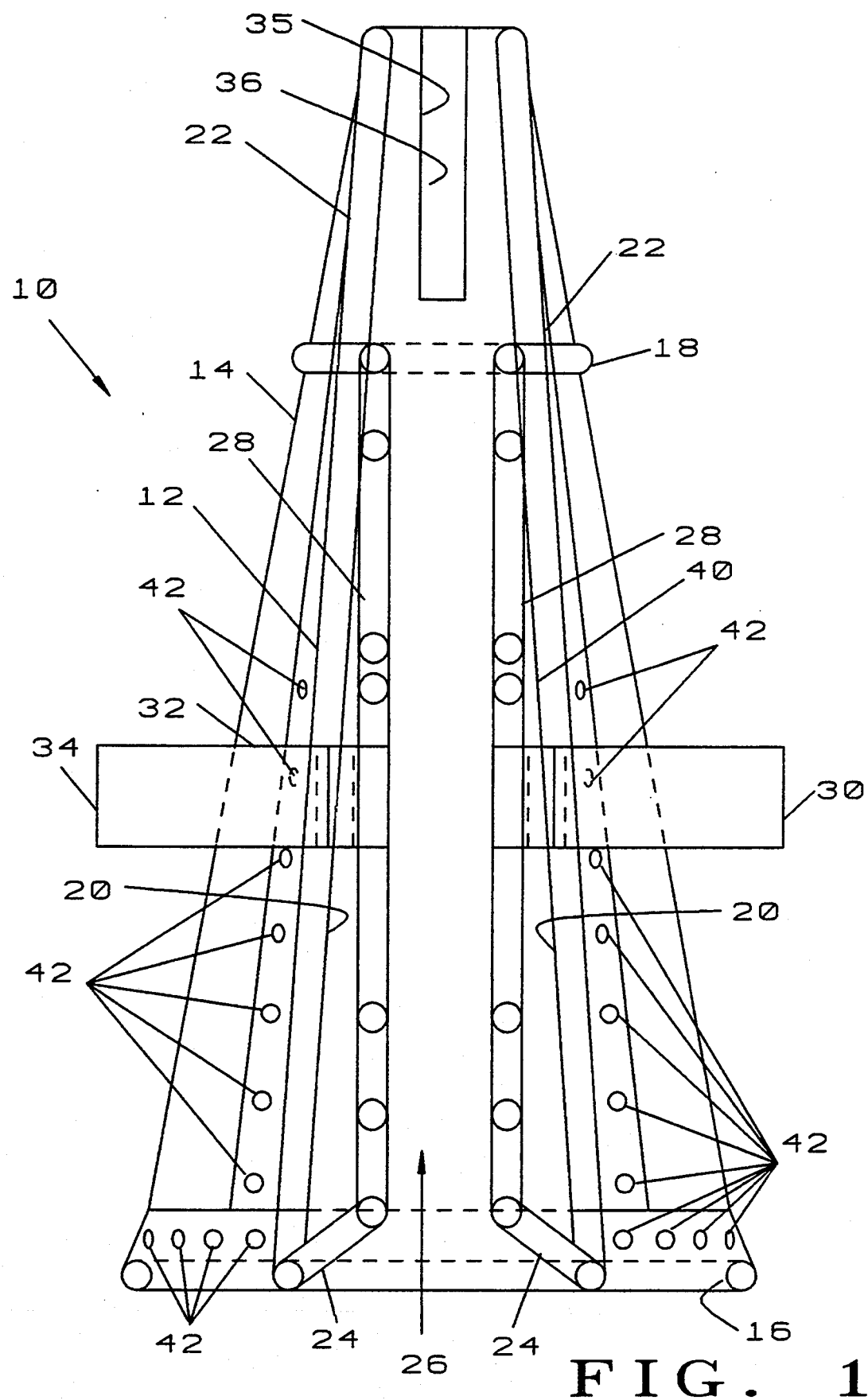
FIG. 1 is a plan view of a fish landing device embodying the present invention.
Figure 2:
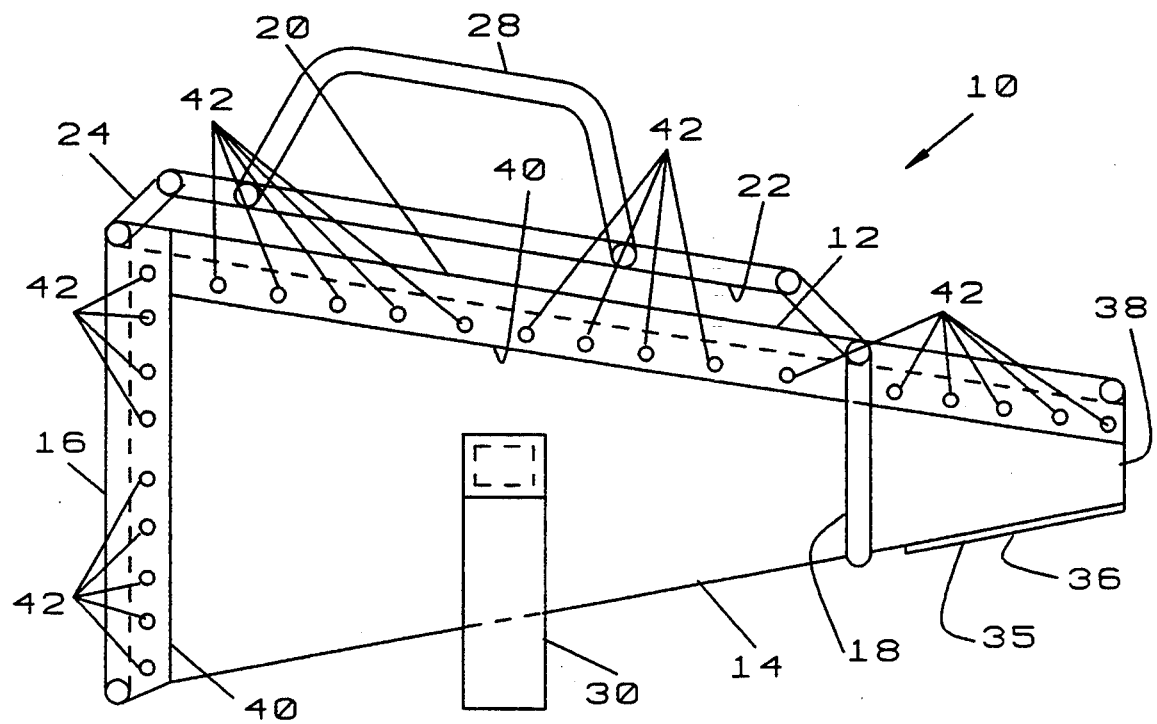
FIG. 2 is a side view of the fish landing device of FIG. 1.
Figure 3:
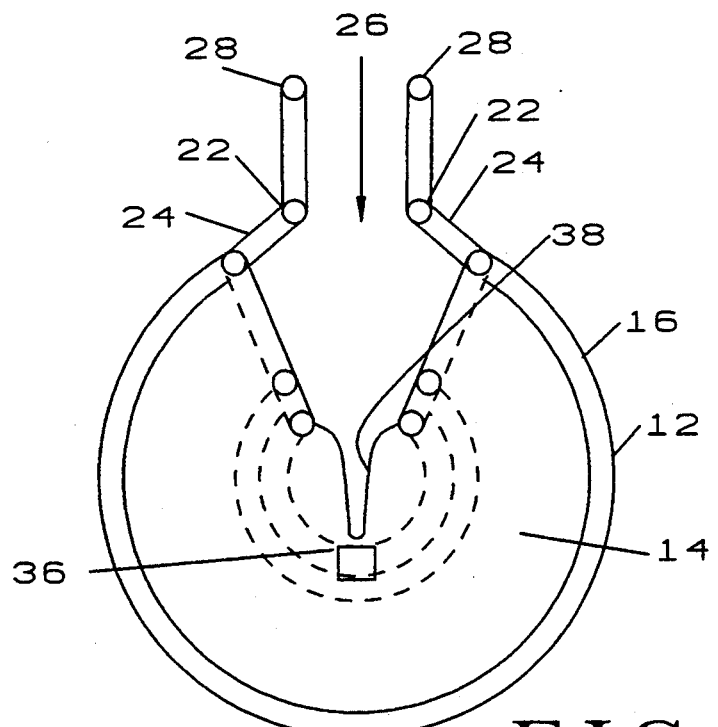
FIG. 3 is a front end view of the fish landing device of FIG. 1.

In that form of the present invention chosen for purposes of illustration, FIG. 1 shows a fish landing device, indicated generally at 10, comprising a frame 12 formed of rigid, yet resilient, material, such as metal, supporting a generally conical cover 14 formed of smooth flexible material, such as plastic sheeting or the like. The frame 12 has a relatively large diameter ring 16 formed at the entry end and a smaller ring 18 separated from the entry loop 16 by a pair of side members 20. The rings 16 and 18 are open at their upper sides and their respective edges are joined by side bars 22. The leading edges of the side bars 22 flare outwardly, as seen at 24, and the side bars 22 are held a slight distance apart from each other by the rigid rings 16 and 18 to define a slot 26 extending the entire length of the cover 14. If desired, handle means 28 may be provided on the side bars 22 to facilitate gripping and manipulation of the landing device 10 once the fish has been drawn into the cover 14. Cinch straps 30 and 32 are secured to the cover 14 and suitable retaining means 34 is provided on strap 32 to permit quick securing and release to strap 30 at a desired position of adjustment. Finally, a slot 35 is provided extending inward from the narrow open end 38 of the cover 14 and releasable fastening means, such as slide fastener 36, is provided to releasably close the slot 35. If desired, the cover 14 may be provided with flaps 40 to overlie the side bars 22 and to be releasably secured by suitable means, such as snaps 42 to releasably attach the cover 14 to the frame 12. If desired, the cover 14 may be formed of opaque material which, when the fish is pulled into the cover 14, will prevent light from reaching the fish's eyes. It has been found that this further deters the tendency of the fish for fighting and flailing about.

In use, the fisherman hooks the fish in the usual manner and fights the fish until it is adjacent the boat. At this point, either the fisherman or an aide grasps the fish landing device 10 by the handle 28 and holds in the water to allow the fisherman to lead the line into ring 16 and through the slot 26 between the side bars 22. Because the frame 12 is rigid, it serves to support the cover 14 in the desired position and, because end 38 of the cover 14 is open, the fisherman can lead the line completely through the landing device 10 and, hence, can pull the fish through ring 16 and completely into the landing device 10, where the fish will be surrounded and enclosed by the cover 14. Due to the conical shape of the landing device 10, the fish will become wedged into the cover 14 and, since the frame 12 holds the cover 14 rigidly in position, the fish will become immobilized as it is drawn toward the narrow end 38 of the cover 14. Straps 30 and 32 may then be secured together and cinched up by retaining means 34 to tightly fasten the cover 14 about the fish to immobilize it with the fish's head firmly held by the cover 14 adjacent the open narrow end 38. Because the fish is then completely enclosed within the cover 14, it will be immobilized and cannot fight or flail about. This prevents the fish from hurting itself and protects the fisherman against getting cut by the fish's fins. Consequently, the fisherman can remove the hook with minimum effort and maximum safety to both the fish and the fisherman. When the fish is to be removed from the landing device 10, the fisherman can undo the slide fastener 36 to enlarge the opening of the narrow end 38 of the cover 14 and the landing device 10 can be lowered into the water to allow the fish to be removed or to swim out of the landing device 10. Alternatively, the straps 30 and 32 can be released and the narrow end 38 can be raised to cause the fish to slide rearwardly out of entry ring 16 to be removed or released.

Figure 4:
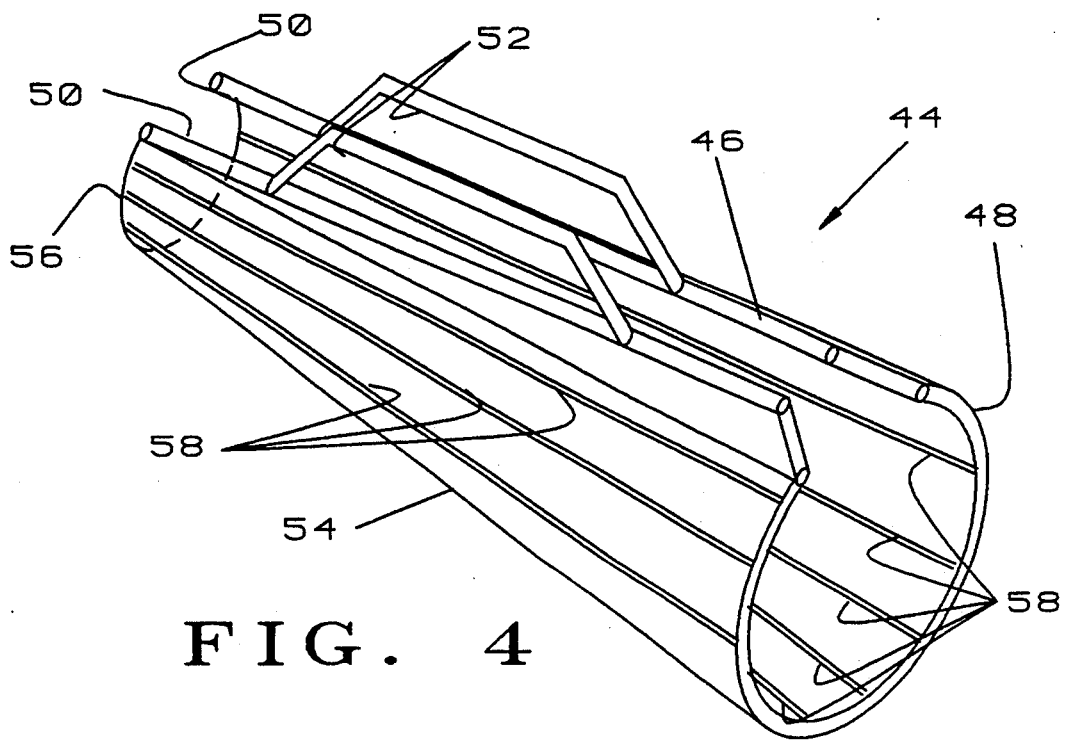
FIG. 4 is an isometric view of an alternative form of the fish landing device of FIG. 1.

FIG. 4 shows an alternative form, indicated generally at 44, of the fish landing device 10 of FIG. 1. In this form, the rigid, resilient frame 46 has an entry ring 48 and a pair of side bars 50 projecting rearwardly from the respective upper ends of the entry ring 48, with a pair of handles 52 formed on the side bars 50 to facilitate manipulation of the fish landing device 44. A cover 54, formed of smooth flexible material, is secured to the frame 46 and is of generally conical shape, having a relatively narrow open rear end 56. If desired, a plurality of stiffening or reinforcing ribs 58 may be provided extending lengthwise of the cover 54. Obviously, the fish landing device 44 of FIG. 4 is less expensive to produce than the fish landing device 10 of FIG. 1. However, both fish landing devices 10 and 44 function in substantially the same manner.

Figure 5:
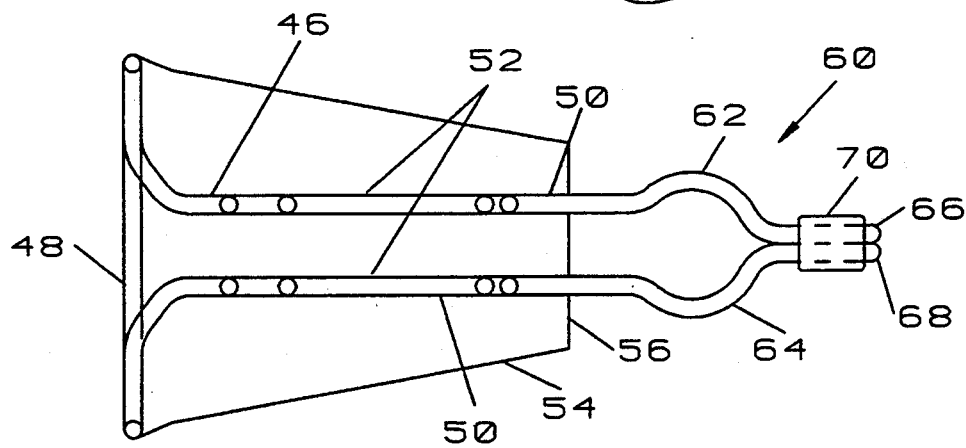
FIG. 5 is a plan view of another alternative form of the fish landing device of FIG. 1.
Figure 6:
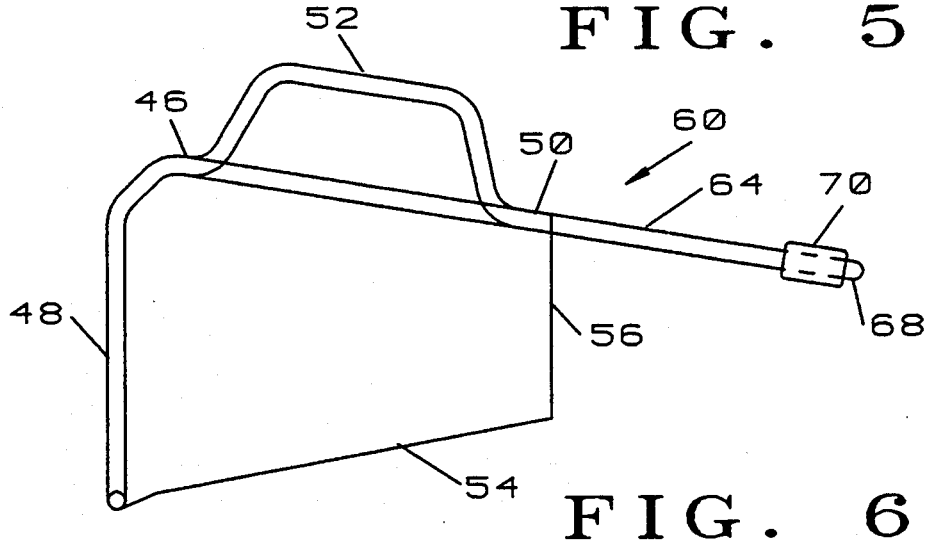
FIG. 6 is a side view of the fish landing device of FIG. 5.

FIGS. 5 and 6 show another alternative form, indicated generally at 60, of the fish landing device 44 of FIG. 4. In this form of the present invention, the rear ends of the side bars 50 are formed with generally semicircular portions 62 and 64, which mate to define a circle, as best seen in FIG. 5, and whose ends 66 and 68 are joined. The ends 66 and 68 may be fixedly joined, if desired. However, preferably, the ends 66 and 68 will be releasably joined by suitable means, such a friction slide 70. The circle formed by the semicircular portions 62 and 64 allow the fisherman to lead the line completely through the cover 54 to entrap the fish, yet serve to join the side bars 50 to form a more rigid structure. The fish landing device 60 of FIGS. 5 and 6 functions in substantially the same manner as the fish landing device 44 of FIG. 4 and the fish landing device 10 of FIG. 1, except that the fisherman must reach through the circle formed by the semicircular portions 62 and 64 to remove the hook or the slide 70 must be removed to release ends 66 and 68 of the side bars 50 to facilitate release or removal of the fish. Subsequently, the slide 70 may again be slid onto the ends 66 and 68 of the side bars 50 to retain the side bars 50 as before.

Figure 7:
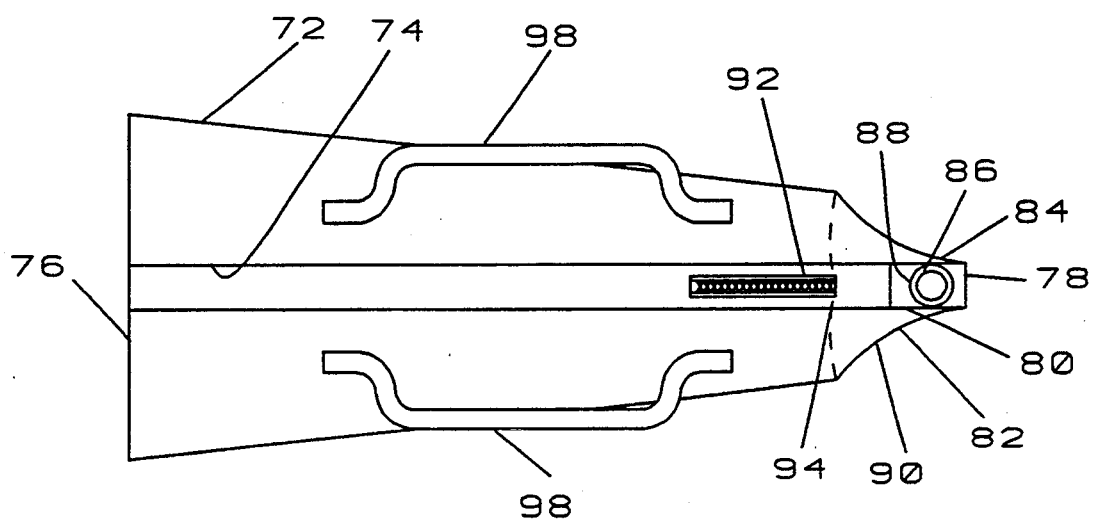
FIG. 7 is a top view of an additional alternative form of the fish landing device of FIG. 1.
Figure 8:
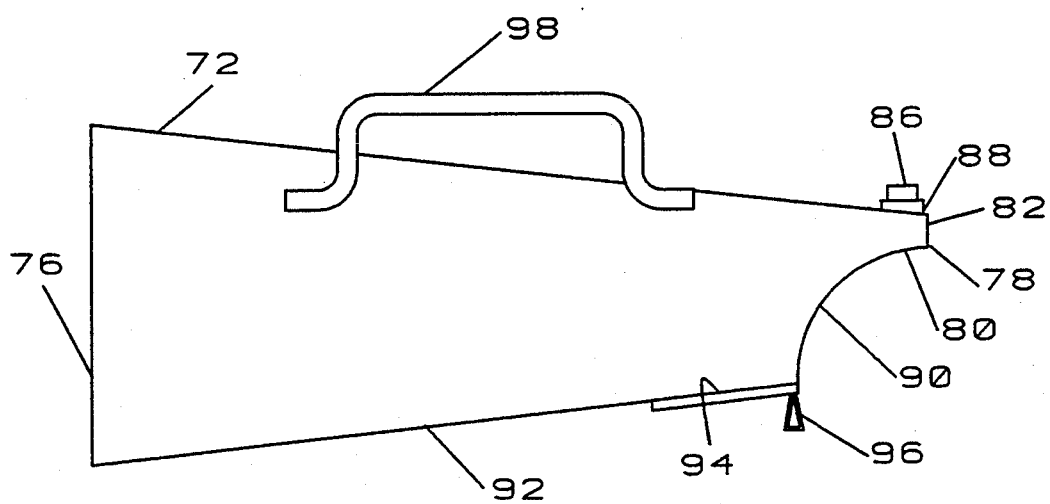
FIG. 8 is a side view of the fish landing device of FIG. 7.

FIGS. 7 and 8 show another alternative form of the fish landing device of the present invention. In this form, the frame is omitted and the conical member 72 is formed of material having sufficient body so that it tends to hold its shape and will be free-standing, at least in water, rather than tending to collapse. The conical member 72 has a slot 74, which is open at the entry end 76, and extends substantially the entire length of the conical member 72, but is closed at the narrow end 78, as by bridge 80. Bridge 80 may be entirely closed. Alternatively, the sides 82 and 84 may overlap and be releasably closed by suitable means, such as button 86 and snap 88. The narrow end 78 is open and is preferably curved, as seen at 90 and the bottom 92 is preferably provided with a slit 94 and releasable fastening means 96, such as a slide fastener, to allow enlarging the opening of the rear end 78 to facilitate removal of hooks and release of the fish, if desired. Finally, handles 98 are provided on each side of the slot 74 to facilitate manipulation of the conical member 72.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A fish landing device comprising:
   a generally conical member formed with an open entry end of relatively large diameter, and tapering rearwardly from to a relatively small diameter open rear end and having a slot communicating with said entry end and extending substantially the entire length of said conical member,
   a second slot formed in said conical member extending inwardly from said open rear end, and
   releasable closure means releasably closing at least one of said slots.

2. The device of claim 1 further comprising:
   a rigid frame having an open-topped entry ring supporting said entry end of said conical member the open top of said ring being located adjacent said slot to allow free passage of a fishing line into said slot.

3. The device of claim 2 wherein:
   said frame is formed of metal.

4. The device of claim 2 wherein:
   said conical member is releasably secured to said frame.

5. The device of claim 2 further comprising:
   a pair of side bars projecting rearwardly from the respective ends of said ring and supporting the edges of said conical member adjacent said slot.

6. The device of claim 5 further comprising:

a second open-topped rigid ring of lesser diameter than said entry ring suspended from said side bars at a point spaced rearwardly from said entry ring.

7. The device of claim 5 wherein:
said side bars each have rear ends formed with a semicircular portion located adjacent the rear end thereof which cooperate to define a circle.

8. The device of claim 5 wherein:
said side bars have rear ends which are fixedly joined together.

9. The device of claim 5 wherein:
said side bars have rear ends and means are provided for releasably joining said rear ends.

10. The device of claim 5 wherein:
a slot extends the entire length of said device between said side bars.

11. The device of claim 1 wherein:
said conical member is formed of smooth material.

12. The device of claim 1 wherein:
said conical member is formed of plastic sheeting.

13. The device of claim 1 further comprising:
handles mounted on said device to facilitate manipulation of said device.

14. The device of claim 1 further comprising:
cinch straps secured to said device and carrying quick release fastening means for releasably attaching said cinch straps to tighten said device about a fish.

15. The device of claim 1 further comprising:
a plurality of stiffening means extending lengthwise of said conical member.

16. The device of claim 1 wherein:
said conical member has means releasably fastening said rear end to releasably close said slot.

17. The device of claim 1 wherein:
said conical member is formed of material which tends to retain its shape so as to be free-standing, at least in water.

18. A fish landing device comprising:
a generally conical member formed with an open entry end of relatively large diameter, and tapering rearwardly from to a relatively small diameter open rear end and having a slot communicating with said entry end and extending substantially the entire length of said conical member, and
cinch straps secured to said device and carrying quick release fastening means for releasably attaching said cinch straps to tighten said device about a fish.

19. The device of claim 18 further comprising:
a rigid frame having an open-topped entry ring supporting said entry end of said conical member.

20. The device of claim 19 wherein:
said frame is formed of metal.

21. The device of claim 18 further comprising:
a pair of side bars projecting rearwardly from the respective ends of said ring and supporting the edges of said conical member adjacent said slot.

22. The device of claim 21 wherein:
said side bars each have rear ends formed with a semicircular portion located adjacent the rear end thereof which cooperate to define a circle.

23. The device of claim 21 wherein:
said side bars have rear ends which are fixedly joined together.

24. The device of claim 21 wherein:
said side bars have rear ends and means are provided for releasably joining said rear ends.

25. The device of claim 21 wherein:
a slot extends the entire length of said device between said side bars.

26. The device of claim 21 further comprising:
a second open-topped rigid ring of lesser diameter than said entry ring suspended from said side bars at a point spaced rearwardly from said entry ring.

27. The device of claim 18 wherein:
said conical member is formed of smooth material.

28. The device of claim 18 wherein:
said conical member is formed of plastic sheeting.

29. The device of claim 18 wherein:
said conical member is releasably secured to said frame.

30. The device of claim 18 further comprising:
handles mounted on said device to facilitate manipulation of said device.

31. The device of claim 18 further comprising:
a plurality of stiffening means extending lengthwise of said conical member.

32. The device of claim 18 further comprising:
a slot formed in said conical member extending inwardly from said open rear end, and
releasable closure means releasably closing said slot.

33. The device of claim 18 wherein:
said conical member has means releasably fastening said rear end to releasably close said slot.

34. The device of claim 18 wherein:
said conical member is formed of material which tends to retain its shape so as to be free-standing, at least in water.

* * * * *